(12) United States Patent
Ehrig et al.

(10) Patent No.: US 12,707,183 B2
(45) Date of Patent: Aug. 11, 2026

(54) METHOD FOR OPERATING HEADPHONES AND EARPHONES

(71) Applicant: Robert Bosch GmbH, Stuttgart (DE)

(72) Inventors: Lutz Ehrig, Dresden (DE); Holger Conrad, Dresden (DE); Tilman Koch, Hamburg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 135 days.

(21) Appl. No.: 18/905,820

(22) Filed: Oct. 3, 2024

(65) Prior Publication Data

US 2025/0119674 A1 Apr. 10, 2025

(30) Foreign Application Priority Data

Oct. 9, 2023 (DE) ..................... 10 2023 209 816.4

(51) Int. Cl.
*H04R 1/10* (2006.01)
*G06F 3/16* (2006.01)

(52) U.S. Cl.
CPC ........... *H04R 1/1016* (2013.01); *G06F 3/165* (2013.01); *H04R 1/1041* (2013.01)

(58) Field of Classification Search
CPC ............................ H04R 1/1016; H04R 1/1041
See application file for complete search history.

(56) References Cited

U.S. PATENT DOCUMENTS 11,287,886 B1 * 3/2022 Harb .......................... G06T 7/20
2016/0187654 A1 * 6/2016 Border ............... G02B 27/0172 359/630
2021/0153293 A1 5/2021 Gong et al.
2024/0078079 A1 * 3/2024 Carrigan ............. G06F 3/04883

FOREIGN PATENT DOCUMENTS

CN 108955758 A 12/2018

* cited by examiner

*Primary Examiner* — Suhan Ni
(74) *Attorney, Agent, or Firm* — NORTON ROSE FULBRIGHT US LLP

(57) ABSTRACT

A method for operating headphones, in particular in-ear headphones. The method includes receiving measurement data from a pressure-measuring device of the headphones; ascertaining a pressure difference between the first pressure and the second pressure based on the measurement data of the pressure-measuring device; recognizing that the headphones are inserted into the hearing region of the user if it has been ascertained that the first pressure is higher than the second pressure; and/or recognizing that the headphones are removed from the hearing region if it has been ascertained that the first pressure is lower than the second pressure. Headphones are also described.

15 Claims, 6 Drawing Sheets a)

b)
207
213
215
217
209
219
D1
P2
221
223
D2
201, 211 a)
207
213
215
217
209
P1
219
D1
221
223
D2
201, 211

METHOD FOR OPERATING HEADPHONES AND EARPHONES

FIELD

The present invention relates to a method for operating headphones. The present invention also relates to in-ear earphones.

BACKGROUND INFORMATION

Certain headphones and methods for operating headphones are described in the related art.

It is an object of the present invention to provide an improved method for operating headphones and improved headphones.

The object may be achieved by the method and the headphones having certain features of the present invention. Advantageous embodiments of the present invention are disclosed herein.

According to one aspect of the present, a method for operating headphones, in particular in-ear headphones, are provided. According to an example embodiment of the present invention, the method comprises:

- receiving measurement data of a pressure-measuring device of the headphones, wherein the measurement data map a pressure difference between a first pressure of an external atmosphere on a first side of the headphones and a second pressure of the external atmosphere on a second side of the headphones, wherein the first side of the headphones is to be inserted into a hearing region of an ear of a user of the headphones, and wherein the second side of the headphones opposite the first side is to be arranged outside the hearing region;
- ascertaining a pressure difference between the first pressure and the second pressure on the basis of the measurement data of the pressure-measuring device;
- recognizing that the headphones are inserted into the hearing region of the user if it has been ascertained that the first pressure is higher than the second pressure; and/or
- recognizing that the headphones are removed from the hearing region if it has been ascertained that the first pressure is lower than the second pressure.

This can achieve the technical advantage that an improved method for operating headphones, in particular in-ear headphones, can be provided. For this purpose, based on measured values of a pressure-measuring device, by means of which a pressure difference between a first pressure of an external atmosphere on a first side of the headphones and a second pressure of the external atmosphere on a second side of the headphones can be measured, the fit of the headphones in a hearing region of an ear of the user of the headphones is ascertained.

Here, the first side of the headphones is characterized by the fact that it is inserted into the hearing region of the ear, while the second side of the headphones is arranged opposite the first side and is thus arranged outside the hearing region of the ear. The pressure differences, once inside the hearing region and once outside the hearing region, can thus be used to recognize whether the headphones are correctly inserted into the hearing region of the ear of the user.

This can recognize and/or prevent, if applicable, the loss of the headphones from slipping out of the hearing region and achieve a better audio playback by prompting the user for inserting the headphones into an optimal position in the hearing region. Here, the hearing region comprises at least the auricle or the ear canal of the ear of the user.

According to one example embodiment of the present invention, the method further comprises:

- recognizing that the headphones are inserted beyond an optimal position of the headphones in the hearing region of the user if it has been ascertained that the first pressure is higher than the second pressure by a predetermined limit value.

This can achieve the technical advantage that by recognizing, on the basis of the pressure difference of the external atmosphere on the first and second sides of the headphones, that the headphones are inserted into the hearing region via an optimal position, damage to the ear or hearing of the user due to audio playback can be avoided.

According to one example embodiment of the present invention, the method further comprises:

- recognizing that the headphones have been suddenly removed from the hearing region of the user and/or that the headphones have fallen down and/or hit an object and/or that an external force is acting on the headphones if it has been ascertained that the first pressure is lower than the second pressure by a predetermined limit value.

This can achieve the technical advantage that by recognizing, based on the pressure differences on the first and second sides of the headphones, that the headphones have suddenly been removed from the hearing region of the user and/or that the headphones have fallen down or impacted an object and/or that an external force is acting on the headphones, the user can be prevented from losing the headphones.

Here, the external force can, for example, be a blow to the headphones or a blast of air acting on the headphones. The attention of the user can then be drawn to the fact that the headphones have been removed from the hearing range. As a result, a loss of the headphones can be prevented.

According to one example embodiment of the present invention, the method further comprises:

- outputting feedback to the user to confirm that the headphones are positioned in the hearing region in a predefined optimal position and/or starting audio playback if it has been recognized that the headphones have been inserted into the hearing region.

This can achieve the technical advantage that the feedback to the user that the headphones are positioned in the hearing region in a predefined optimal position and/or the start of audio playback makes the optimal operation of the headphones possible.

According to one example embodiment of the present invention, the method further comprises:

- switching off the headphones and/or interrupting audio playback of the headphones if it has been recognized that the headphones have been removed from the hearing region and/or inserted too far into the hearing region and/or fallen down and/or hit an object and/or subjected to a force.

This can achieve the technical advantage that by switching off the headphones or interrupting the audio playback in the event that it is recognized that the headphones have been removed from the hearing region and/or inserted too far into the hearing region or the headphones have fallen down or a force has acted on the headphones, the optimal operation of the headphones is made possible.

In addition, attention of the user can be drawn to the particular situation by the aforementioned display, such that damage to hearing or loss of the headphones or damage to the headphones can be avoided.

According to one example embodiment of the present invention, the headphones comprise a sound-generating structure having at least two movably mounted sound-generating elements, wherein the sound-generating structure is fluidically connected to the first and second side of the headphones, wherein the at least two movably mounted sound-generating elements can be positioned relative to one another in a first position and a second position, wherein the at least two sound-generating elements can be positioned in the first position if the first pressure is higher than the second pressure, wherein the at least two sound-generating elements can be positioned in the second position if the first pressure is lower than the second pressure, wherein the measured values of the pressure-measuring device map a positioning of the at least two sound-generating elements in the first or second position, and wherein ascertaining the pressure difference comprises:

- ascertaining a positioning of the at least two sound-generating elements in the first position or the second position on the basis of the measured values of the pressure-measuring device.

This can achieve the technical advantage that a simple determination of the measured pressure values of the first and second pressures on the first and second sides of the headphones is made possible. Here, the pressures are ascertained based on the positionings of the sound-generating elements of the sound-generating structure. Thus, the pressure-measuring device uses the existing elements, i.e., the sound-generating structure, which is primarily used for sound generation for the audio playback of the headphones. Additional elements, such as pressure sensors, can thus be avoided.

This simplifies the structure of the headphones, reduces production costs and allows the headphones to be designed to take up as little space as possible. In addition, by ascertaining the first and second positions of the sound-generating elements within the sound-generating structure, which in each case correspond to the first and second pressures on the first and second sides of the headphones, a clear ascertainment of the first and second pressures on the first and second sides of the headphones or the pressure difference is made possible.

According to one example embodiment of the present invention, the pressure-measuring device comprises an electrode element connected to the sound-generating structure, wherein the measured values comprise capacitance values of the electrode element, and wherein ascertaining the positioning comprises:

- ascertaining the positioning of the at least two sound-generating elements in the first position if a capacitance value of the electrode element is less than or equal to a predefined limit value; and
- ascertaining the positioning of the at least two sound-generating elements in the second position if a capacitance value of the electrode element is greater than the predefined limit value.

This can achieve the technical advantage that, via the electrode element which is electrically connected to the sound-generating structure, a precise ascertainment of the positioning of the sound-generating elements in the first or second positions is made possible. Based on the ascertaining the capacitance values of the electrode element, the positionings of the sound-generating elements within the sound-generating structure can thus be ascertained.

According to an example embodiment of the present invention, based on the positionings the sound-generating elements, a correlation to the first and second pressures of the external atmosphere prevailing on the first and second sides of the headphones can be created. Thus, the measurement of the pressure differences on the first and second sides of the headphones can be performed simply based on the measurement of the capacitance values of the electrode element. If applicable, this requires a calibration of the capacitance values of the electrode element in relation to the positionings of the sound-generating elements within the sound-generating structure or in relation to the first and second pressures of the external atmosphere prevailing on the first and second sides of the headphones.

According to an example embodiment of the present invention, the pressure-measuring device does not necessarily measure absolute pressure values of the first and second pressures on the first or second sides of the headphones. Instead, the pressure-measuring device primarily ascertains, in the form of the pressure difference between the first and second pressures on the first and second sides of the headphones, whether the first pressure on the first side of the headphones is greater than, less than or equal to the second pressure on the second side of the headphones. The ascertainment of an absolute pressure value is not required for the method according to the present invention.

According to one example embodiment of the present invention, the method further comprises:

- checking whether audio playback is being executed on the basis of control signals of a control unit of the headphones;
- executing the aforementioned steps if no audio playback is being executed;
- if audio playback is being performed:
- checking whether the capacitance values of the electrode element correlate with an activation of the sound-generating structure;
- checking whether the capacitance values of the electrode element are greater than the capacitance values to be expected according to the audio playback;
- outputting feedback to the user that the headphones are positioned in the hearing region in a predefined optimal position if the capacitance values are less than the expected capacitance values; and
- switching off the headphones and/or interrupting the audio playback of the headphones if the capacitance values are greater than the expected capacitance values.

This can achieve the technical advantage that the functions described above of ascertaining the position of the headphones within the hearing region or the removal of the headphones or falling down and impacting of the headphones can also be performed during operation while audio playback is being executed.

As mentioned above, the sound-generating structure is primarily used for sound generation for the audio playback of the headphones. For sound generation, the sound-generating elements within the sound-generating structure are set in motion by activation, in order to generate the sound signals for audio playback.

According to an example embodiment of the present invention, for ascertaining the pressure differences on the first and second sides of the headphones by ascertaining the positionings of the sound-generating elements within the sound-generating structure, the corresponding activation of the sound-generating structure for sound generation must thus be taken into account during audio playback.

When sound generation is executed, it is thus initially ascertained whether the control signals for activating the sound-generating structure correlate with the capacitance values of the electrode element, by means of which capacitance values the positionings of the sound-generating elements within the sound generation are ascertained. If there is a correlation between the control signals and the capacitance values of the electrode element, the method steps described above are executed.

If there is no correlation between the control signals and the capacitance values, it is checked whether the measured capacitance values of the electrode element are greater than the capacitance values that would be expected when generating sound according to the control signals.

Even with pressure equalization between the first and second pressures on the first and second sides of the headphones, corresponding capacitance values are measured by the electrode element during audio playback and by the associated movement of the sound-generating elements of the sound-generating structure against one another. Here, however, these correspond to the control signals and are thus not due to pressure differences on the first and second sides of the headphones, but are based exclusively on the movement of the sound-generating elements for sound generation.

However, according to an example embodiment of the present invention, if it is ascertained that the measured capacitance values are higher than the expected capacitance values based on the control signals when sound is generated, the headphones are switched off or audio playback is interrupted. If the capacitance values are higher than the expected capacitance values, this is interpreted as meaning that the first pressure on the first side of the headphones is lower than the second pressure on the second side of the headphones.

If, on the other hand, it is ascertained that the measured capacitance values of the electrode element are lower than the expected capacitance values, this is interpreted to mean that the first pressure on the first side of the headphones is higher than the second pressure on the second side of the headphones and it is indicated to the user that the headphones are positioned in a predefined optimal position in the hearing region and/or audio playback is started.

Thus, the method can be executed easily during audio playback, and the corresponding positionings of the headphones in the hearing region can be ascertained using the method steps described above.

According to one aspect of the present invention, a computing unit is provided, which is configured to execute the method for operating headphones according to the present invention.

According to one aspect of the present invention, headphones with a sound-generating structure, a pressure-measuring device and a computing unit are provided.

This can achieve the technical advantage that improved headphones can be provided, which are configured to execute the method described above for operating headphones with the technical advantages mentioned.

According to one example embodiment of the present invention, the sound-generating structure is fluidly connected to an external environment of the headphones on a first side of the headphones and to an external environment of the headphones on a second side of the headphones, wherein the sound-generating structure comprises at least two movably mounted sound-generating elements, wherein the at least two movably mounted sound-generating elements can be positioned relative to one another in a first position and a second position, wherein the at least two sound-generating elements can be positioned in the first position if a first pressure of an external atmosphere on the first side of the headphones is greater than a second pressure of an external atmosphere on a second side of the headphones, wherein the at least two sound-generating elements can be positioned in the second position if the first pressure is higher than the second pressure, and wherein measured values of the pressure-measuring device map a positioning of the at least two sound-generating elements in the first or second position.

This can achieve the technical advantage that the pressure differences of the atmospheric pressures on the first and second sides of the headphones can be precisely ascertained by ascertaining the position of the sound-generating elements within the sound-generating structure. Additional components, such as pressure sensors, are therefore not required for executing the method according to the present invention.

According to one example embodiment of the present invention, the sound-generating structure comprises a housing unit, wherein the at least two movably mounted sound-generating elements are arranged in a receiving space of the housing unit, wherein at least one first opening is arranged on a first side of the housing unit, wherein at least one second opening is arranged on a second side of the housing unit, wherein the first side of the headphones is to be inserted into a hearing region of a user of the headphones, wherein the second side of the headphones opposite the first side is to be arranged outside the hearing region, wherein fluid communication between the external atmosphere on the first side and the second side of the headphones with the receiving space is effected via the first and second openings, and wherein the at least one first opening is arranged at a level between the at least two sound-generating elements, and wherein the second opening is offset with respect to the first opening and is arranged adjacent to the two sound-generating elements.

This can achieve the technical advantage that by arranging the first and second openings at the first and second sides of the housing unit of the sound-generating structure, it can be achieved that at a first pressure at the first side of the headphones, which is greater than the second pressure at the second side of the headphones, the sound-generating elements are positioned in the first position within the housing unit based on the pressure differences.

If, on the other hand, the second pressure on the second side of the headphones is greater than the first pressure on the first side of the headphones, the sound-generating elements are positioned in the second position within the housing unit through the correspondingly arranged second openings.

The pressure ascertainment or the determination of the pressure differences on the first and second sides of the headphones can thus be performed purely passively, by the sound-generating elements within the sound-generating structure being positioned in the first and second positions primarily by the pressure differences on the first and second sides of the headphones. The capacitance values of the electrode element are also ascertained passively by automatically changing the capacitance values with changes in the position of the sound-generating elements relative to one another.

As described above, the ascertainment of the pressure differences executed in this way based on the positionings of the sound-generating elements can also be performed during the activation of the sound-generating elements for sound generation for audio playback.

According to the present invention, for ascertaining the pressure differences, no exact determination of position of the first and second positions of the sound-generating elements within the sound-generating structure are ascertained. Instead, the capacitance values of the electrode element are ascertained.

These can be interpreted with the corresponding positions of the sound-generating elements within the sound-generating structure.

However, for determining the pressure differences, no explicit positions of the sound-generating elements within the sound-generating structure need to be generated. For this purpose, it is sufficient to ascertain whether the capacitance values of the electrode element are greater than, less than or equal to a predefined limit value.

Accordingly, the capacitance values of the electrode element ascertained to be greater than, less than or equal to the limit value can be equated with the particular positionings of the sound-generating elements within the sound-generating structure, and thus associated with the particular pressure differences of the first and second pressures on the first and second sides of the headphones. Accordingly, the method described also works during audio playback.

According to one example embodiment of the present invention, the pressure-measuring device comprises an electrode element connected to the sound-generating structure.

This can achieve the technical advantage that due to the electrode element and the corresponding capacitance values of the electrode element as described above, the first and second positions of the sound-generating elements within the sound-generating structure and thus the corresponding pressure differences between the first and second pressures on the first and second sides of the headphones are ascertained.

According to one example embodiment of the present invention, the sound-generating structure is a MEMS structure and the headphones are designed as MEMS headphones.

This can achieve the technical advantage that high-performance headphones can be provided.

According to one aspect of the present invention, a computer program product is provided, comprising commands that, when the program is executed by a data processing unit, cause the data processing unit to execute the method for operating headphones according to one of the above-described embodiments of the present invention.

Example embodiments of the present invention are described with reference to the figures.

DETAILED DESCRIPTION OF EXAMPLE EMBODIMENTS

Figure 1:
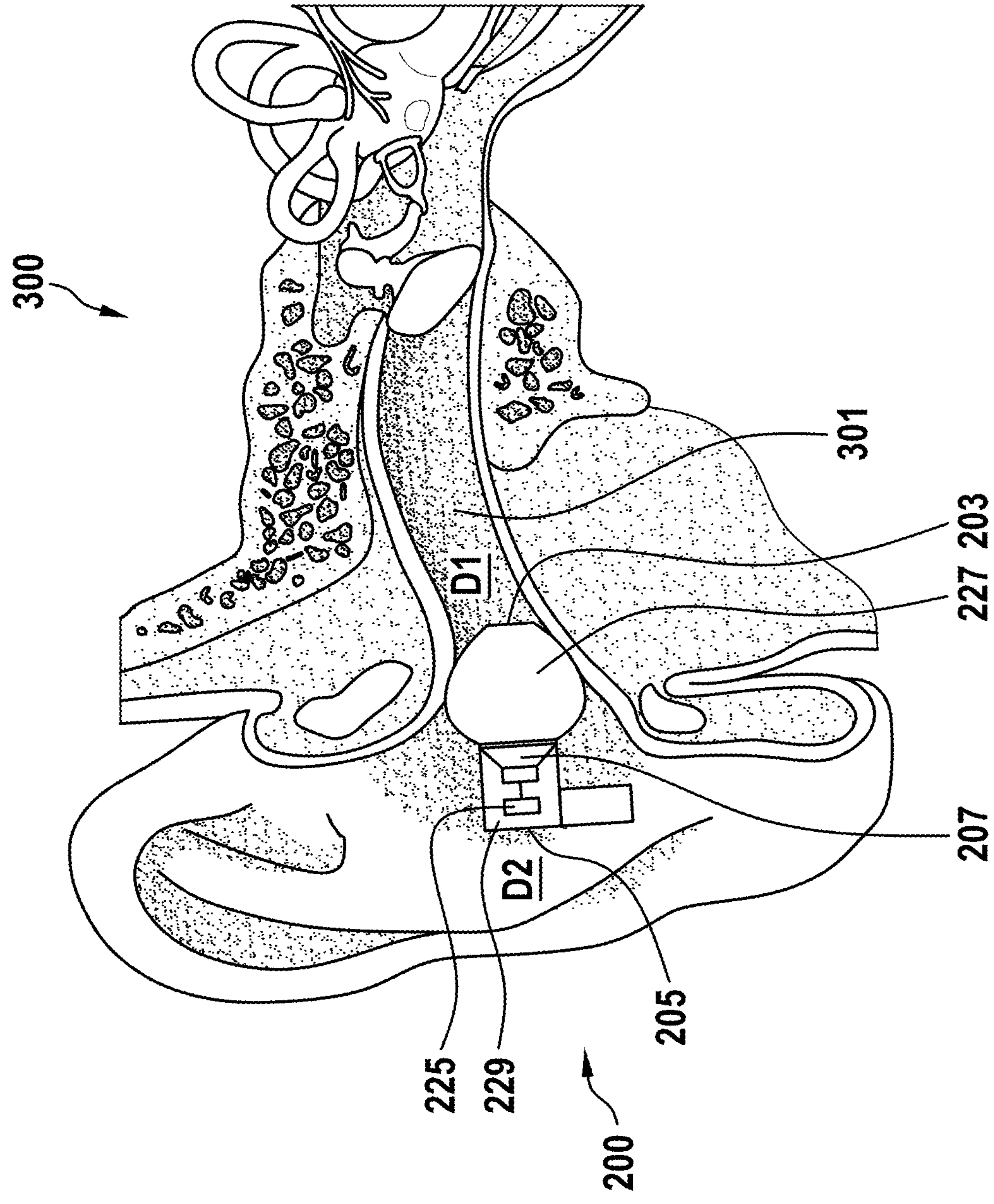
FIG. 1 shows a schematic representation of headphones according to one example embodiment of the present invention.

FIG. 1 is a schematic representation of headphones 200 according to one embodiment.

In the embodiment shown, the headphones 200 comprise a main body 229 and an insertion element 227 connected to the main body 229. A sound-generating element 209 and at least one control unit or computing unit 225 are formed in the main body 229. The headphones 200 comprise a first side 203, which is formed on the insertion element 227 and can be inserted into a hearing region 301 of an ear 300 of a user of the headphones 200, and a second side 205, which is arranged opposite the first side 203 and is thus not inserted into the hearing region 301. The main body 229 and the insertion element 227 can be designed according to the in-ear headphones from the related art and comprise corresponding features.

A first pressure D1 prevails at the first side 203 and a second pressure D2 prevails at the second side 205. Here, the first pressure D1 describes a pressure of the external atmosphere within the hearing region 301 when the headphones 200 are inserted into the hearing region 301. The second pressure D2, on the other hand, describes an atmospheric pressure of the external atmosphere outside the headphones 200 and outside the hearing region 301.

Figure 2:
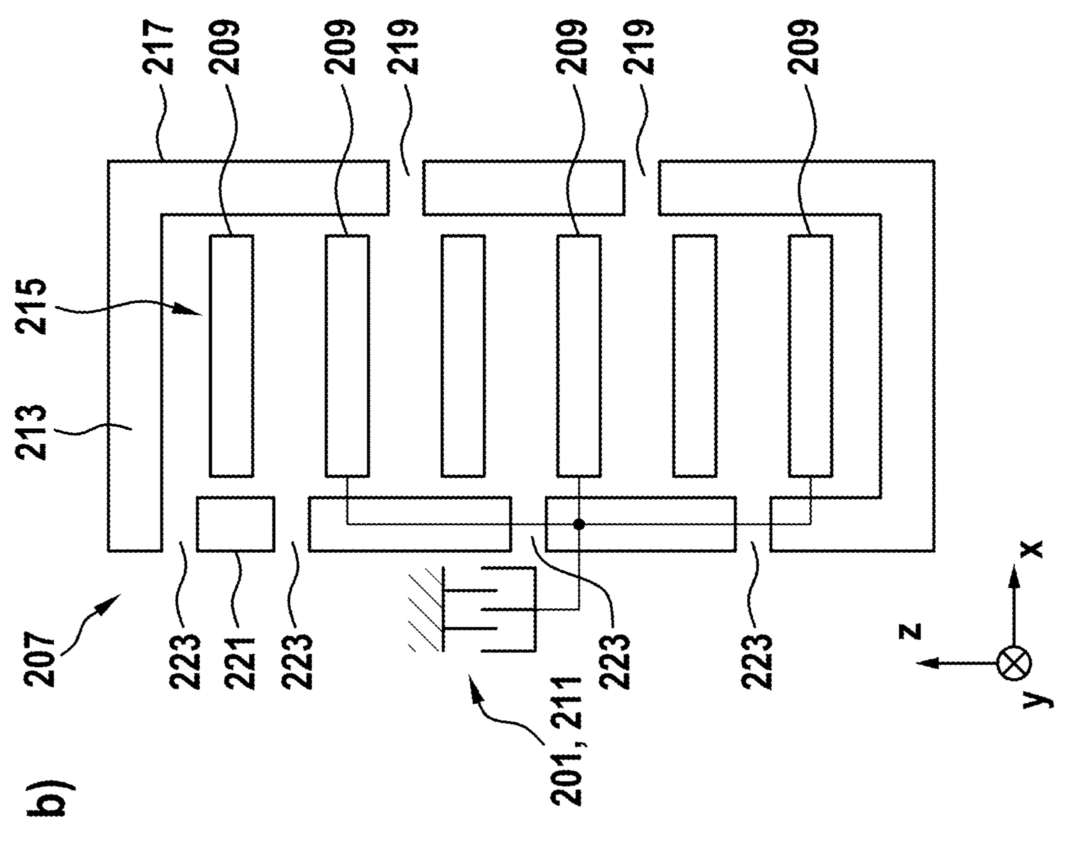
FIG. 2 shows a schematic representation of headphones and a sound-generating structure according to one example embodiment of the present invention.
Figure 2:
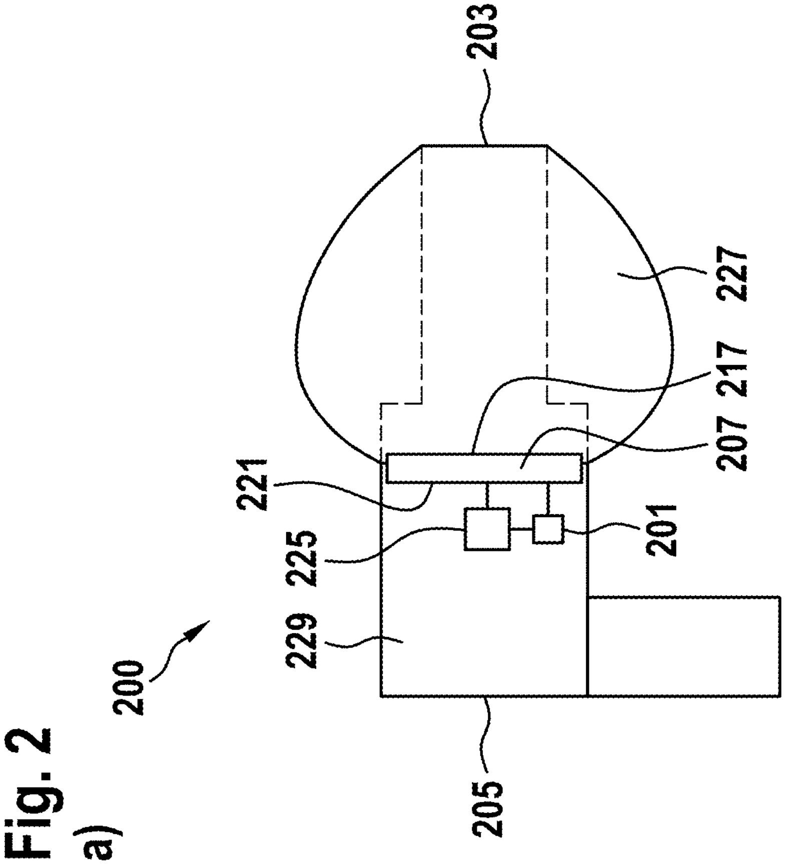

FIG. 2 is a schematic representation of headphones 200 and a sound-generating structure 207 according to one embodiment.

In the embodiment shown, the main body 229 in graph a) further comprises a pressure-measuring device 201 in addition to the sound-generating structure 207 and the control unit/computing unit 225. A pressure difference between the first pressure D1 at the first side 203 and the second pressure D2 at the second side 205 of the headphones 200 can be ascertained via the pressure-measuring device 201.

The sound-generating structure 207 is fluidly connected to the external environment at the first side 203 and the second side 205 of the headphones 200.

Graph b) shows a schematic representation of the sound-generating structure 207. In the embodiment shown, the sound-generating structure 207 is designed as a MEMS structure and comprises a housing unit 213 and a plurality of sound-generating elements 209 arranged in the housing unit 213.

In the embodiment shown, the sound-generating elements 209 are designed as beam elements or surface elements. The sound-generating elements 209 are arranged within the receiving space 215 of the housing unit 213 so as to be movable relative to one another along the z-direction of the coordinate system shown.

The housing unit 213 comprises first openings 219 on a first side 217. On a second side 221, the housing unit 213 comprises second openings 223. The sound-generating structure 207 is arranged in the main body 229 of the headphones 200 in such a way that the first side 217 of the housing unit 213 is arranged adjacent to the first side 203 of the headphones 200, and the second side 221 of the housing unit 213 is arranged adjacent to the second side 205 of the headphones 200 correspondingly.

As shown in graph b), the first and second openings 219, 223 of the housing unit 213 are offset relative to one another along the z-axis. A first opening 219 is thus arranged in each case between two second openings 223 in relation to the z-axis of the coordinate system shown.

Furthermore, the pressure-measuring device 201 is directly connected to the sound-generating elements 209 of the sound-generating structure 207. In the embodiment shown, the pressure-measuring device 201 is designed as an electrode element 211.

Figure 3:
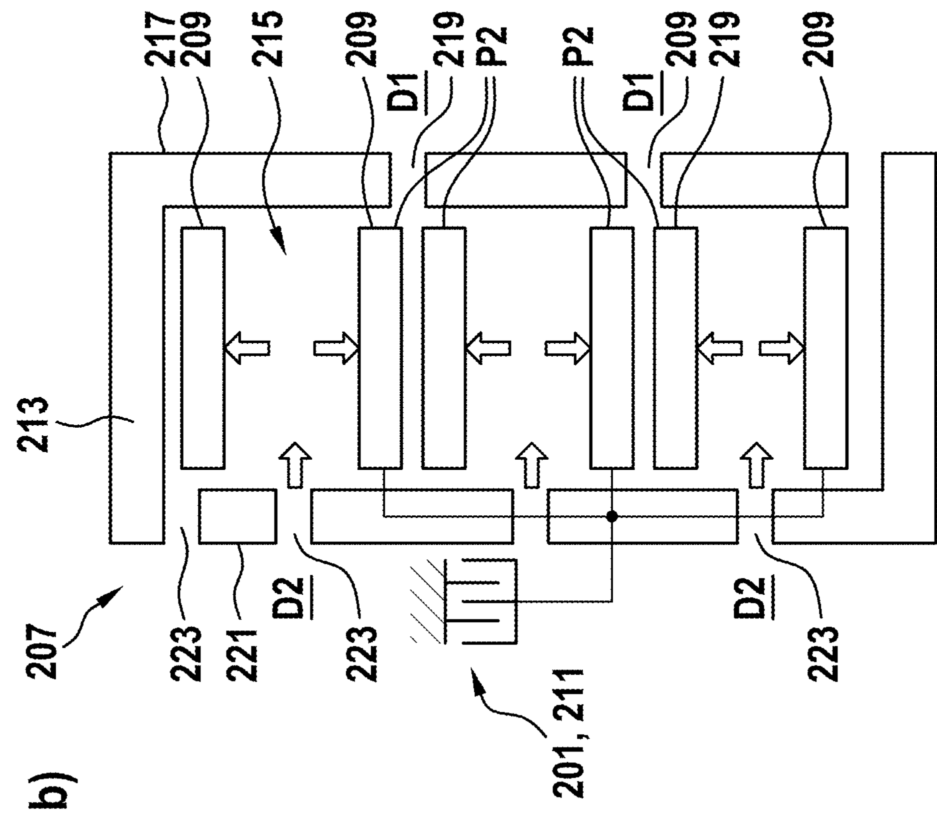
FIG. 3 shows a further schematic representation of the sound-generating structure according to a further example embodiment of the present invention.
Figure 3:
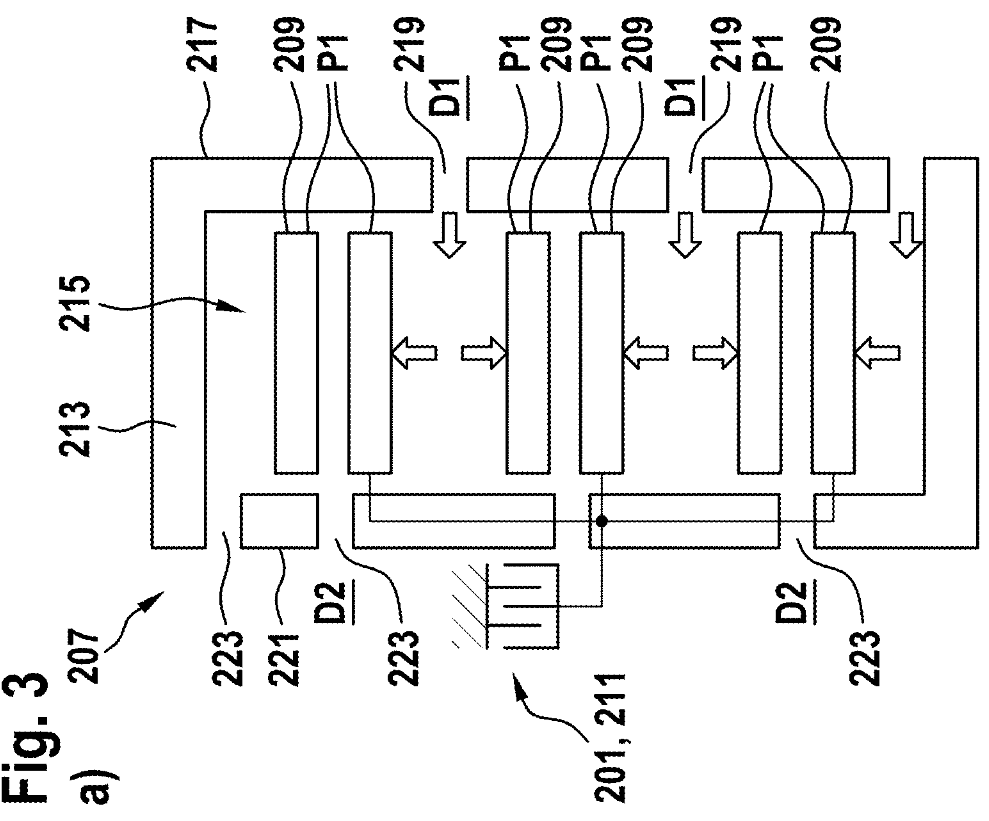

FIG. 3 shows a further schematic representation of the sound-generating structure 207 according to a further embodiment.

Graphs a) and b) show two scenarios in which the sound-generating elements 209 are positioned in the first and second positions P1, P2 by the air pressure of the external atmosphere at the first and second sides 203, 205 of the headphones 200 within the receiving space 215 of the housing unit 213 of the sound-generating structure 207.

Here, graph a) shows the scenario in which the first pressure D1 on the first side 203 of the headphones 200 is greater than the second pressure D2 on the second side 205 of the headphones 200. The air of the external atmosphere thus flows into the receiving chamber 215 through the first openings 219 of the first side 217 of the housing unit 213. As a result, the sound-generating elements 209 are pressed in the z-direction or in the opposite z-direction of the coordinate system shown from the first openings 219 in the direction of the second openings 223 of the second side 221 of the housing unit 213.

Graph b) shows the opposite case, in which the second pressure D2 on the second side 205 of the headphones 200 is greater than the first pressure D1. The air from the external atmosphere thus flows into the receiving chamber 215 via the second openings 223 on the second side 221 of the housing unit 213 of the sound-generating structure 207. Accordingly, the sound-generating elements 209 are pushed away from the second openings 223 in the direction of the first openings 219 of the housing unit 213 and are thus positioned in the second position P2.

Here, the capacitance values measured by the electrode element 211 differ accordingly between the cases shown in graphs a) and b), such that, based on the capacitance values of the electrode element 211, the different positionings P1, P2 of the sound-generating elements 209 within the sound-generating structure 207 and the pressure differences between the first and second pressures D1, D2 based thereon can be ascertained.

Figure 4:
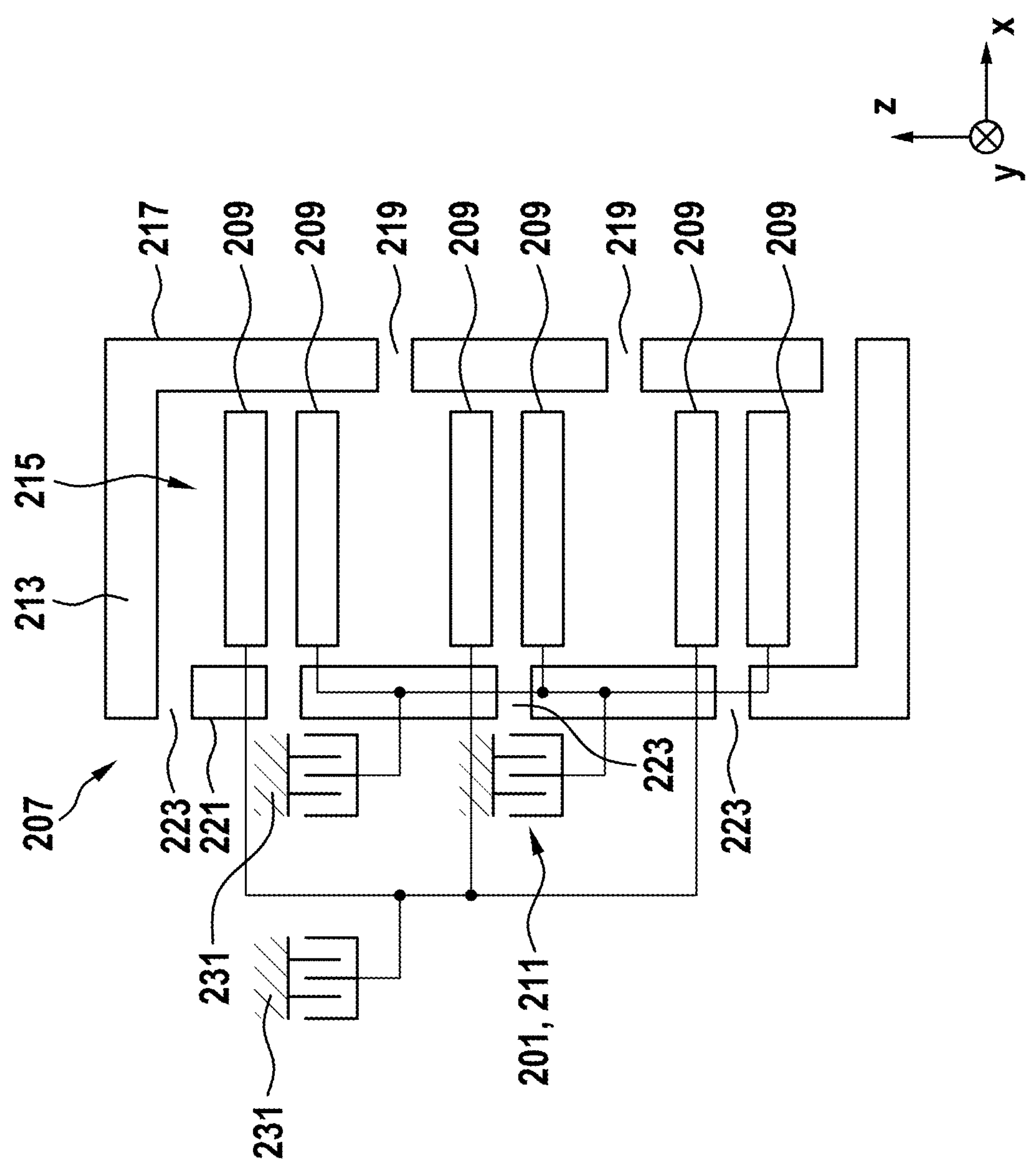
FIG. 4 shows a further schematic representation of the sound-generating structure according to a further example embodiment of the present invention.

FIG. 4 shows a further schematic representation of the sound-generating structure 207 according to a further embodiment.

The embodiment of the sound-generating structure 207 shown in FIG. 4 is based on the embodiments of the sound-generating structure 207 of FIGS. 2 and 3 and comprises all the features shown therein. If these remain unchanged, a new detailed description will not be provided.

By analogy to FIG. 2, the sound-generating structure 207 shown is in the rest position. This can be achieved by the first and second pressures D1, D2 on the first and second sides 203, 205 of the headphones 200 being equal.

In contrast to the embodiments of FIGS. 2 and 3, the sound-generating structure 207 further comprises two drive elements 231. The sound-generating elements 209 for sound generation for audio playback of the headphones 200 can be set in relative motion to one another via the drive elements 231.

The sound-generating elements 209 can thus be moved relative to one another along the z-direction or in the opposite direction to the z-direction of the coordinate system shown. In the embodiment shown, the drive elements 231 are also designed as electrode elements.

Figure 5:
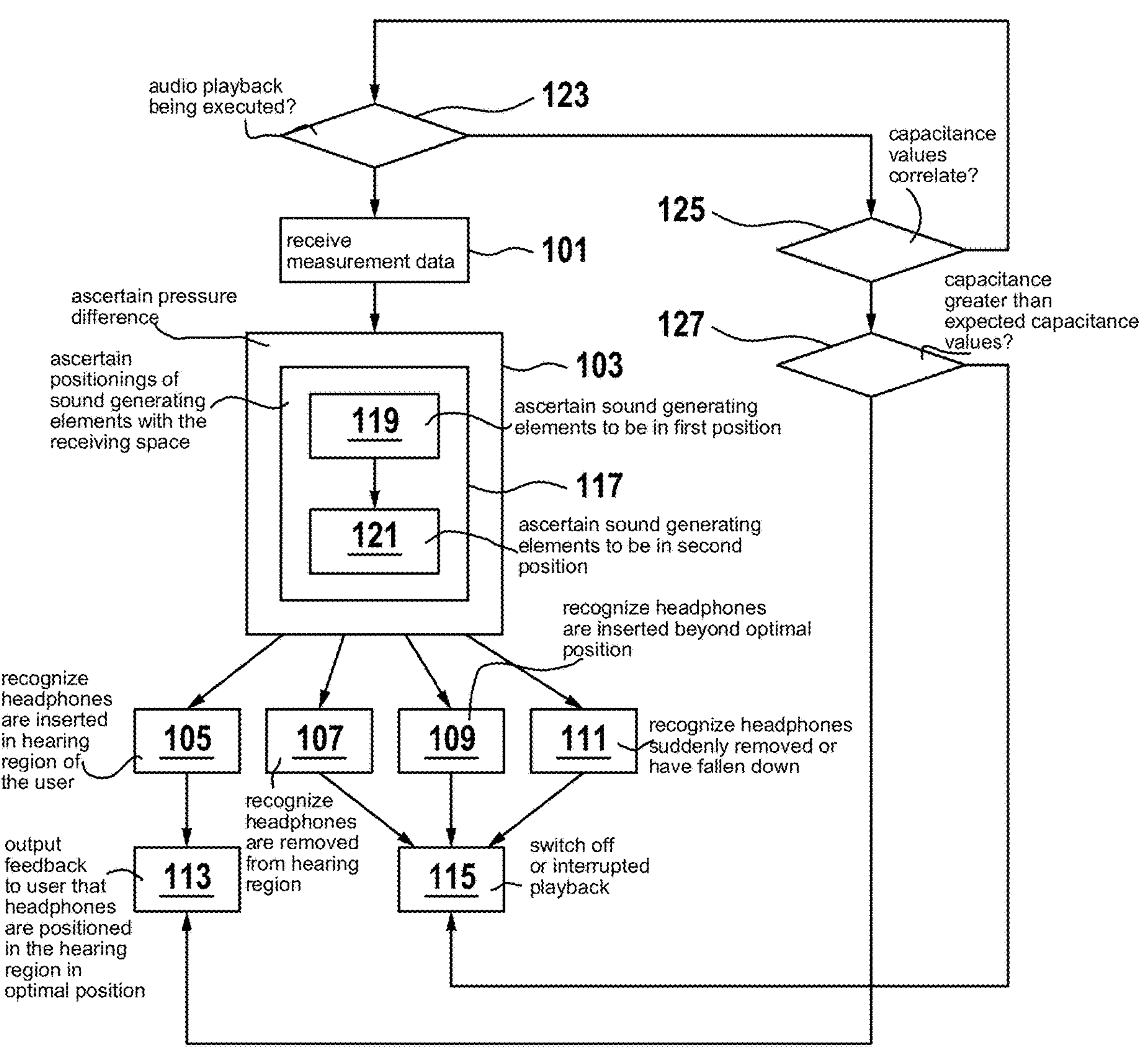
FIG. 5 shows a flow chart of a method for operating headphones according to one example embodiment of the present invention.

FIG. 5 is a flow chart of a method 100 for operating headphones 200 according to one embodiment.

In the embodiment shown, for operating the headphones 200, a method step 123 initially checks whether audio playback is being executed by the headphones 200.

If no audio playback is executed by the headphones 200, measurement data of a pressure-measuring device 201 is initially received in a method step 101. Here, the measurement data map a pressure difference between the first pressure D1 of the external atmosphere on the first side 203 of the headphones 200 and the second pressure D2 on the second side 205 of the headphones 200. According to the embodiments described above, the pressure-measuring device 201 comprises an electrode element 211.

By means of the electrode element 211, positions P1, P2 of the sound-generating elements 209 of the sound-generating structure 207 designed as a MEMS structure can be ascertained.

For this purpose, in a further method step 103, the stated pressure difference between the first and second pressures D1, D2 at the first and second sides 203, 205 of the headphones 200 is ascertained based on the measurement data of the pressure-measuring device 201.

For this purpose, in a method step 117, positionings of the sound-generating elements 209 of the sound-generating structure 207 within the receiving space 215 of the housing unit 213 of the sound-generating structure 207 are ascertained.

Subsequently, in a method step 119, the sound-generating elements 209 are ascertained to be positioned in a first position P1 if the capacitance values of the electrode element 211 of the pressure-measuring device 201 are less than or equal to a predefined limit value.

On the other hand, in a further method step 121, the sound-generating elements 209 are ascertained to be positioned in the second position P2 if the capacitance values of the electrode element 211 are greater than the predefined limit value.

If the sound-generating elements 209 are ascertained to be positioned in the first position P1 based on the capacitance values of the electrode element 211, this is equated to the first pressure D1 on the first side 203 of the headphones 200 being greater than the second pressure D2 on the second side 205 of the headphones 200. If, on the other hand, the sound-generating elements 209 are ascertained to be positioned in the second position P2 based on the capacitance values of the electrode element 211, this is equated with the second pressure D2 being greater than the first pressure D1.

In a further method step 105, it is then recognized that the headphones 200 are inserted into the hearing region 301 of the user if it was previously ascertained that the first pressure D1 is higher than the second pressure D2.

In a further method step 107, it is ascertained that the headphones 200 are removed from the hearing region 301 if it was previously ascertained that the first pressure D1 is lower than the second pressure D2.

In a further method step 109, it is recognized that the headphones 200 are inserted beyond an optimal position of the headphones 200 into the hearing region 301 if it was previously ascertained that the first pressure D1 is higher than the second pressure D2 by a predetermined limit value. The further the headphones 200 are inserted into the hearing region 301 of the user, the further the volume of air within the hearing region 301, i.e.: within the ear canal, is compressed, which leads to an increase in the air pressure, i.e.: the pressure D1 at the first side 203 of the headphones 200.

If this pressure exceeds a previously defined limit value, the insertion of the headphones 200 beyond the optimal position in the hearing region 301 is recognized.

In a further method step 111, it is recognized that the headphones 200 have been suddenly removed from the hearing region 301 of the user and/or that the headphones 200 have fallen down or impacted an object and/or that an external force is acting on the headphones 200 if it has been ascertained that the first pressure D1 is lower than the second pressure D2 by a predetermined limit value. In the case of a mechanical effect on the headphones, the cause of the movement of the sound-generating elements is no longer a pressure difference, but is the mass inertia of the sound-generating elements.

If the headphones 200 are abruptly removed from the hearing region 301, i.e. the ear canal, of the user, the volume of air within the ear canal is abruptly increased, as a result of which a sharp pressure drop in the first pressure D1 arises on the first side 203 of the headphones 200. If the pressure drop of the pressure D1 exceeds a predetermined limit value, the sudden removal of the headphones 200 from the hearing region 301, which may be caused, for example, by the headphones 200 falling down or being lost, is recognized.

Accordingly, the application of force to the headphones 200, primarily on the second side 205, or the impact of the headphones 200 on an object, can result in the second pressure D2 being greatly increased in relation to the first pressure D1, as a result of which the first pressure D1 is correspondingly greatly reduced relative to the second pressure D2. If the first pressure D1 again falls below the predetermined limit value, the above-described circumstances are recognized, which in turn indicate that the headphones 200 have been lost.

In a further method step 113, feedback is output to the user that the headphones 200 are positioned in the hearing region 301 in the predefined optimal position and/or audio playback is started if it has been recognized that the headphones 200 have been inserted into the hearing region 301. The feedback can be effected by an audio signal, for example.

On the other hand, in a method step 115, the headphones 200 are switched off and/or audio playback of the headphones 200 is interrupted if it was previously recognized that the headphones 200 were removed from the hearing region 301 and/or inserted too far into the hearing region 301 and/or that the headphones 200 have fallen down and/or impacted an object and/or that a force is acting on the headphones 200.

This makes it possible to automatically stop the operation of the headphones 200 when the headphones 200 are removed from the hearing region 301, in order to avoid unnecessary strain on the battery power of the headphones 200 and to prevent damage to the sound-generating elements in the event of excessive deflection and thus damage to the headphones.

If, on the other hand, it is ascertained in the method step 123 that an audio playback is being executed, a further method step 125 checks whether the capacitance values of the electrode element 211 correlate with an activation of the sound-generating structure 207. For this purpose, it is checked whether the capacitance values of the electrode element 211 correlate with the control signals for activating the sound-generating elements 209 of the sound-generating structure 207 for sound generation and audio playback.

Here, if it is ascertained that there is a correlation, the method steps 101 to 121 described above are executed again.

If, on the other hand, it is ascertained that there is no correlation, a further method step 127 checks whether the capacitance values of the electrode element 211 are greater than the capacitance values to be expected according to the audio playback. As already described above, by activating the sound-generating structure 207, the sound-generating elements 209 are deflected from the rest position and positioned in the corresponding first or second positions P1, P2. As a result, the corresponding capacitance values are measured by the electrode element 211.

If the capacitance values measured by the electrode element 211 are less than the capacitance values to be expected based on the control signals of the activation of the sound-generating structure 207 for audio playback, this is interpreted to mean that the headphones 200 are inserted into the hearing region 301 of the user, and thus the feedback is output to the user in the method step 113 that the headphones 200 are positioned in the hearing region 301 in the predefined position.

If, on the other hand, the capacitance values measured by the electrode element 211 are less than or equal to the capacitance values to be expected according to the control signals of the activation of the sound-generating structure 207, this is interpreted to mean that the headphones 200 are outside the hearing region 301.

Here, there is no pressure difference between the pressures D1 and D2 at the first and second sides 203, 205 of the headphones 200 and thus no effect of the atmospheric pressures D1, D2 on the positionings of the sound-generating elements 209 in the sound-generating structure 207, such that the measured capacitance values of the electrode element 211 are based exclusively on the activation of the sound-generating structure 207 and are thus equal to the capacitance values to be expected according to the activation for audio playback.

If, on the other hand, the capacitance values measured by the electrode element 211 are greater than the capacitance values to be expected based on the activation for audio playback, this is interpreted to mean that the headphones 200 are actively removed from the hearing region 301 or that the headphones 200 have fallen down or impacted an object. Accordingly, the headphones 200 are switched off according to the method step 115 or the audio playback of the headphones 200 is interrupted.

Figure 6:
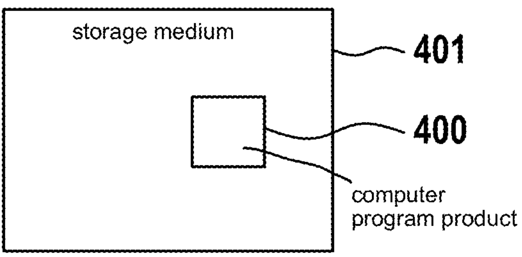
FIG. 6 shows a schematic representation of a computer program product, according to an example embodiment of the present invention.

FIG. 6 is a schematic representation of a computer program product 400, comprising instructions that, when the program is executed by a data processing unit, cause the unit to execute the method 100 for operating headphones 200.

In the embodiment shown, the computer program product 400 is stored on a computing unit or a storage medium 401. Here, the storage medium 401 can be any storage medium from the related art.

The invention claimed is:

1. A method for operating headphones, the headphones being in-ear headphones, the method comprising the following steps:

receiving measurement data from a pressure-measuring device of the headphones, wherein the measurement data map a pressure difference between a first pressure of an external atmosphere on a first side of the headphones and a second pressure of the external atmosphere on a second side of the headphones, wherein the first side of the headphones is to be inserted into a hearing region of an ear of a user of the headphones, and wherein the second side of the headphones opposite the first side is to be arranged outside the hearing region;

ascertaining a pressure difference between the first pressure and the second pressure based on the measurement data of the pressure-measuring device; and (i) recognizing that the headphones are inserted into the hearing region of the user when it has been ascertained that the first pressure is higher than the second pressure, and/or (ii) recognizing that the headphones are removed from the hearing region when it has been ascertained that the first pressure is lower than the second pressure.

2. The method according to claim 1, further comprising:

recognizing that the headphones are inserted beyond an optimal position of the headphones into the hearing region of the user whenit has been ascertained that the first pressure is higher than the second pressure by a predetermined limit value.

3. The method according to claim 1, further comprising:

recognizing, when it has been ascertained that the first pressure is lower than the second pressure by a predetermined limit value, that the headphones have been suddenly removed from the hearing region of the user and/or that the headphones have fallen down and/or the headphones hit an object and/or that an external force is acting on the headphones.

4. The method according to claim 1, further comprising:

when it has been recognized that the headphones have been inserted into the hearing region, (i) outputting feedback to the user that the headphones are positioned in the hearing region in a predefined optimal position, and/or (ii) starting audio playback.

5. The method according to claim 1, further comprising:

switching off the headphones and/or interrupting audio playback of the headphones when it has been recognized that: (i) the headphones have been removed from the hearing region and/or (ii) the headphones are inserted too far into the hearing region and/or (iii) the headphones have fallen down and/or (iv) the headphones hit an object and/or (v) the headphones have been subjected to force.

6. The method according to claim 1, wherein the headphones include a sound-generating structure having at least two movably mounted sound-generating elements, wherein the sound-generating structure is fluidically connected to the first side and the second side of the headphones, wherein the at least two movably mounted sound-generating elements can be positioned relative to one another in a first position and a second position, wherein the at least two sound-generating elements can be positioned in the first position when the first pressure is higher than the second pressure, wherein the at least two sound-generating elements can be positioned in the second position when the first pressure is lower than the second pressure, wherein measured values of the pressure measuring device map a positioning of the at least two sound-generating elements in the first position or second position, and wherein the ascertainment of the pressure difference includes:

ascertaining a positioning of the at least two sound-generating elements in the first position or the second position based on the measured values of the pressure-measuring device.

7. The method according to claim 6, wherein the pressure-measuring device includes an electrode element connected to the sound-generating structure, wherein the measured values include capacitance values of the electrode element, and wherein ascertaining the positioning includes:

ascertaining the positioning of the at least two sound-generating elements in the first position when a capacitance value of the electrode element is less than or equal to a predefined limit value; and ascertaining the positioning of the at least two sound-generating elements in the second position when a capacitance value of the electrode element is greater than the predefined limit value.

8. The method according to claim 7, further comprising the following steps:

checking whether audio playback is being executed based on control signals of a control unit of the headphones;

based on determining audio playback is being performed:

checking whether the capacitance values of the electrode element correlate with an activation of the sound-generating structure, checking whether the capacitance values of the electrode element are greater than the capacitance values to be expected according to the audio playback, outputting feedback to the user that the headphones are positioned in the hearing region in a predefined optimal position if the capacitance values are less than the expected capacitance values; and when the capacitance values are greater than the expected capacitance values, switching off the headphones and/or interrupting the audio playback of the headphones.

9. A computing unit that is configured to operate headphones, the headphones being in-ear headphones, the computing unit configured to:

receive measurement data from a pressure-measuring device of the headphones, wherein the measurement data map a pressure difference between a first pressure of an external atmosphere on a first side of the headphones and a second pressure of the external atmosphere on a second side of the headphones, wherein the first side of the headphones is to be inserted into a hearing region of an ear of a user of the headphones, and wherein the second side of the headphones opposite the first side is to be arranged outside the hearing region;

ascertain a pressure difference between the first pressure and the second pressure based on the measurement data of the pressure-measuring device; and (i) recognize that the headphones are inserted into the hearing region of the user when it has been ascertained that the first pressure is higher than the second pressure, and/or (ii) recognize that the headphones are removed from the hearing region when it has been ascertained that the first pressure is lower than the second pressure.

10. Headphones, comprising:

a sound-generating structure;

a pressure-measuring device; and a computing unit configured to operatine the headphones, the computing unit configured to:

receive measurement data from the pressure-measuring device of the headphones, wherein the measurement data map a pressure difference between a first pressure of an external atmosphere on a first side of the headphones and a second pressure of the external atmosphere on a second side of the headphones, wherein the first side of the headphones is to be inserted into a hearing region of an ear of a user of the headphones, and wherein the second side of the headphones opposite the first side is to be arranged outside the hearing region;

ascertain a pressure difference between the first pressure and the second pressure based on the measurement data of the pressure-measuring device, and (i) recognize that the headphones are inserted into the hearing region of the user when it has been ascertained that the first pressure is higher than the second pressure, and/or (ii) recognize that the headphones are removed from the hearing region when it has been ascertained that the first pressure is lower than the second pressure.

11. The headphones according to claim 10, wherein the sound-generating structure is fluidically connected to an external environment of the headphones on the first side of the headphones and to an external environment of the headphones on the second side of the headphones, wherein the sound-generating structure includes at least two movably mounted sound-generating elements, wherein the at least two movably mounted sound-generating elements can be positioned relative to one another in a first position and a second position, wherein the at least two sound-generating elements can be positioned in the first position when a first pressure of an external atmosphere on the first side of the headphones is greater than a second pressure of an external atmosphere on the second side of the headphones, wherein the at least two sound-generating elements can be positioned in the second position when the first pressure is higher than the second pressure, and wherein measured values of the pressure-measuring device map a positioning of the at least two sound-generating elements in the first position or the second position.

12. The headphones according to claim 11, wherein the sound-generating structure includes a housing unit, wherein the at least two movably mounted sound-generating elements are arranged in a receiving space of the housing unit, wherein at least one first opening is arranged on a first side of the housing unit, wherein at least one second opening is arranged on a second side of the housing unit, wherein the first side of the headphones is to be inserted into a hearing region of a user of the headphones, wherein the second side of the headphones opposite the first side of the headphones is to be arranged outside the hearing region, wherein fluid communication between the external atmosphere on the first side and the second side of the headphones with the receiving space is effected via the first and second openings, and wherein the at least one first opening is arranged at a level between the at least two sound-generating elements, and wherein the second opening is offset with respect to the first opening and is arranged adjacent to the two sound-generating elements.

13. The headphones according to claim 10, wherein the pressure-measuring device includes an electrode element connected to the sound-generating structure.

14. The headphones according to claim 10, wherein the sound-generating structure is a MEMS structure.

15. A non-transitory computer-readable medium on which is stored a computer program including commands for operating headphones, the headphones being in-ear headphones, the commands, when executed by a data processor, causing the data processor to perform the following steps:

receiving measurement data from a pressure-measuring device of the headphones, wherein the measurement data map a pressure difference between a first pressure of an external atmosphere on a first side of the headphones and a second pressure of the external atmosphere on a second side of the headphones, wherein the first side of the headphones is to be inserted into a hearing region of an ear of a user of the headphones, and wherein the second side of the headphones opposite the first side is to be arranged outside the hearing region;

ascertaining a pressure difference between the first pressure and the second pressure based on the measurement data of the pressure-measuring device; and (i) recognizing that the headphones are inserted into the hearing region of the user when it has been ascertained that the first pressure is higher than the second pressure, and/or (ii) recognizing that the headphones are removed from the hearing region when it has been ascertained that the first pressure is lower than the second pressure.

* * * * *